United States Patent

McGrath

[15] 3,702,437

[45] Nov. 7, 1972

[54] DIAGNOSTIC AND REPAIR SYSTEM FOR SEMICONDUCTORS

[72] Inventor: John W. McGrath, Allentown, Pa.

[73] Assignee: Western Electric Company, Incorporated, New York, N.Y.

[22] Filed: June 1, 1970

[21] Appl. No.: 42,176

[52] U.S. Cl. ..............................324/158 F, 324/73 R

[51] Int. Cl. ..........................G01r 31/22, G01r 31/02

[58] Field of Search ...............324/158 D, 158 R, 73, 324/51, 158 T, 324/158 F, 158 P

[56] References Cited

UNITED STATES PATENTS 3,549,999 12/1970 Norton ....................324/51 X

OTHER PUBLICATIONS

Donath, W. E.; " Testing of Integrated Circuits," IBM Tech. Dis. Bulletin; Vol. 8; No. 8, Jan. 1966; pg. 1,166.

Hobbis et al.; " Light Operated ..." ; IBM Tech. Dis. Bulletin; Vol. 8; No. 4; Sept. 1965; pg. 683.

*Primary Examiner*—Rudolph V. Rolinec
*Assistant Examiner*—Ernest F. Karlsen
*Attorney*—W. M. Kain, R. P. Miller and R. Y. Peters

[57] ABSTRACT

A system is provided for diagnosing and repairing electronic assemblies which include a plurality of semiconductor devices interconnected in parallel, wherein at least one of the devices is faulty. Radiant energy is directed onto each of the devices successively and the response of each device to the radiant energy is noted. When a device causes a response dissimilar from the others it is identified as a faulty device and replaced.

Alternatively, disturbing energy is transferred to the devices from a remote source by capacitive or inductive coupling through electric and magnetic fields respectively.

11 Claims, 2 Drawing Figures

PATENTED NOV 7 1972 3,702,437

INVENTOR
J.W. McGRATH
BY P. J. Tribulsky Jr.
ATTORNEY

DIAGNOSTIC AND REPAIR SYSTEM FOR SEMICONDUCTORS

BACKGROUND OF THE INVENTION

1. Field of the Invention

This invention relates to methods and apparatus for diagnosing and repairing electronic assemblies. More particularly, the invention relates to diagnosis and repair of electronic assemblies having a plurality of semiconductor devices interconnected in parallel.

2. Description of the Prior Art

The field of integrated-semiconductor electronics has developed to a compromise position between extremely large scale integration and use of discreet active devices. This compromise position is manifested in electronic assemblies which consist of substrates with printed interconnection patterns having a plurality of small integrated-circuit chips bonded to the interconnection pattern. Such assemblies are described by E. D. Reed in an article entitled "Integrated Electronics", page 258 of *The Bell Laboratories Record*, Vol. 47, No. 8, September 1969.

These electronic assemblies have advantages over very large scale integrated units in that separate integrated-circuit chips can be replaced if they are determined to be faulty without a need for discarding the entire assembly. It has been difficult however, to take advantage of this desirable characteristic of this form of electronics assembly because, in many cases, the integrated-circuit chips are connected along parallel interconnection paths. In such parallel arrangements, a faulty integrated-circuit chip will result in an entire assembly functioning improperly. Thus, while it is readily determinable that at least one chip in a parallel array is faulty, it is not easy to determine which of the plurality of integrated-circuit chips is faulty. In order to be able to take advantage of the repairability of these electronic assemblies, one must have the capability of identifying defective ones of the individual integrated-circuit chips in the event of such a failure.

In more conventional electrical systems, it is possible to identify a faulty one of a number of electrical units connected in parallel by connecting meters or other diagnostic tools directly to the separate units. However, the systems involved in integrated electronics are extremely small, the integrated-circuit chips being in the order of magnitude of one-sixteenth inch square and the interconnecting circuit paths being printed lines in the order of magnitude of 0.002 inch wide. Use of conventional meter connection techniques on these small geometries is impracticable. Even if small probes are used for connection of meters, there is a possibility for causing irreparable damage to the delicate interconnecting printed lines.

SUMMARY OF THE INVENTION

It is, therefore, an object of the invention to provide a diagnostic system for identifying faulty ones of semiconductor devices among a plurality of such devices connected in parallel.

It is a further object of the invention to provide a system wherein faulty semiconductor devices which are connected in parallel with other semiconductor devices can be made to demonstrate a unique characteristic so that they can be easily identified.

It is a still further object of the invention to develop such a unique reaction in a nondestructive way.

These and other objects are achieved by utilizing a diagnostic technique wherein a signal of predetermined characteristic is placed across a parallel interconnection pattern on which a failure has occurred and then directing a source of disturbing energy onto each of the semiconductor devices which are connected on the parallel interconnection pattern. As each of the devices is subjected successively to the disturbing energy, a change in the signal characteristic on the interconnection path is noted. A semiconductor device which produces a change dissimilar to the changes associated with the majority of the interconnected semiconductor devices can be identified as faulty.

BRIEF DESCRIPTION OF THE DRAWINGS

Other objects and features of the present invention will be more readily understood from the following detailed description of specific embodiments thereof when read in conjunction with the appended drawings in which.

DETAILED DESCRIPTION

Illustratively, the inventive diagnostic technique is described in connection with identifying faulty silicon integrated-circuit chips connected in parallel on a flat substrate. It is to be understood, however, that the diagnostic technique would be equally workable for other semiconductor devices. Similarly, the technique will work in parallel-circuit arrangements which are in non-planar configurations.

Figure 1:
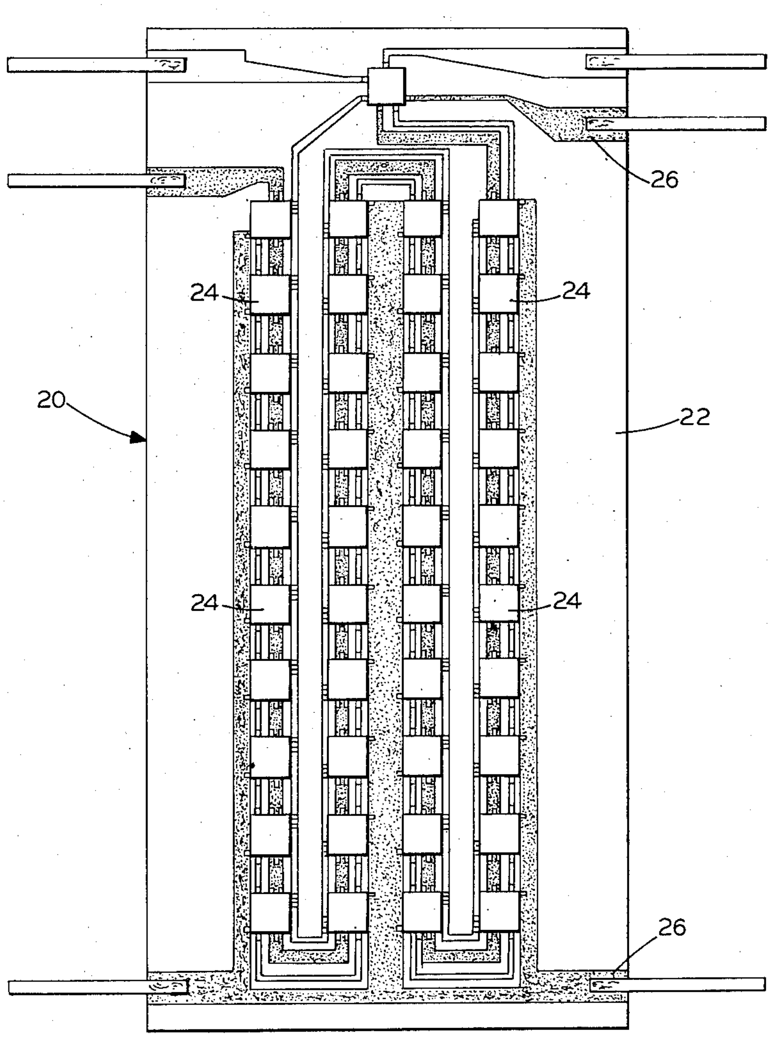
FIG. 1 is a plan view of an electronic assembly on which the invention can be utilized to effect repairs.

FIG. 1 shows a typical electronic assembly, designated generally by the numeral 20, wherein the inventive diagnostic technique has usefulness. A detailed understanding of the nature of such an assembly can be had by referring to an article entitled "Assembling Beam-Lead Sealed-Junction Integrated-Circuit Packages" by M. P. Eleftherion in the *Western Electric Engineer*, December 1967, pages 16–23. The assembly 20 includes a substrate 22 and a plurality of semiconductor devices or beam-lead integrated-circuit chips 24 bonded to a metallic interconnection pattern. Typically, a number of interconnection paths exist for functions like providing power, providing timing pulses and providing information inputs to the chips 24. For purposes of illustration, one of these parallel paths, that associated with power, is highlighted in FIG. 1 and is identified by the numeral 26.

Attention can be focused on the power path 26 while bearing in mind that problems relating to the power path may similarly exist in any one of a multitude of other parallel paths. If after final testing of the electronic assembly 20 an improper amount of current flows through the power path 26, one can surmise that one of the integrated-circuit chips 24 is not functioning properly with respect to power.

Figure 2:
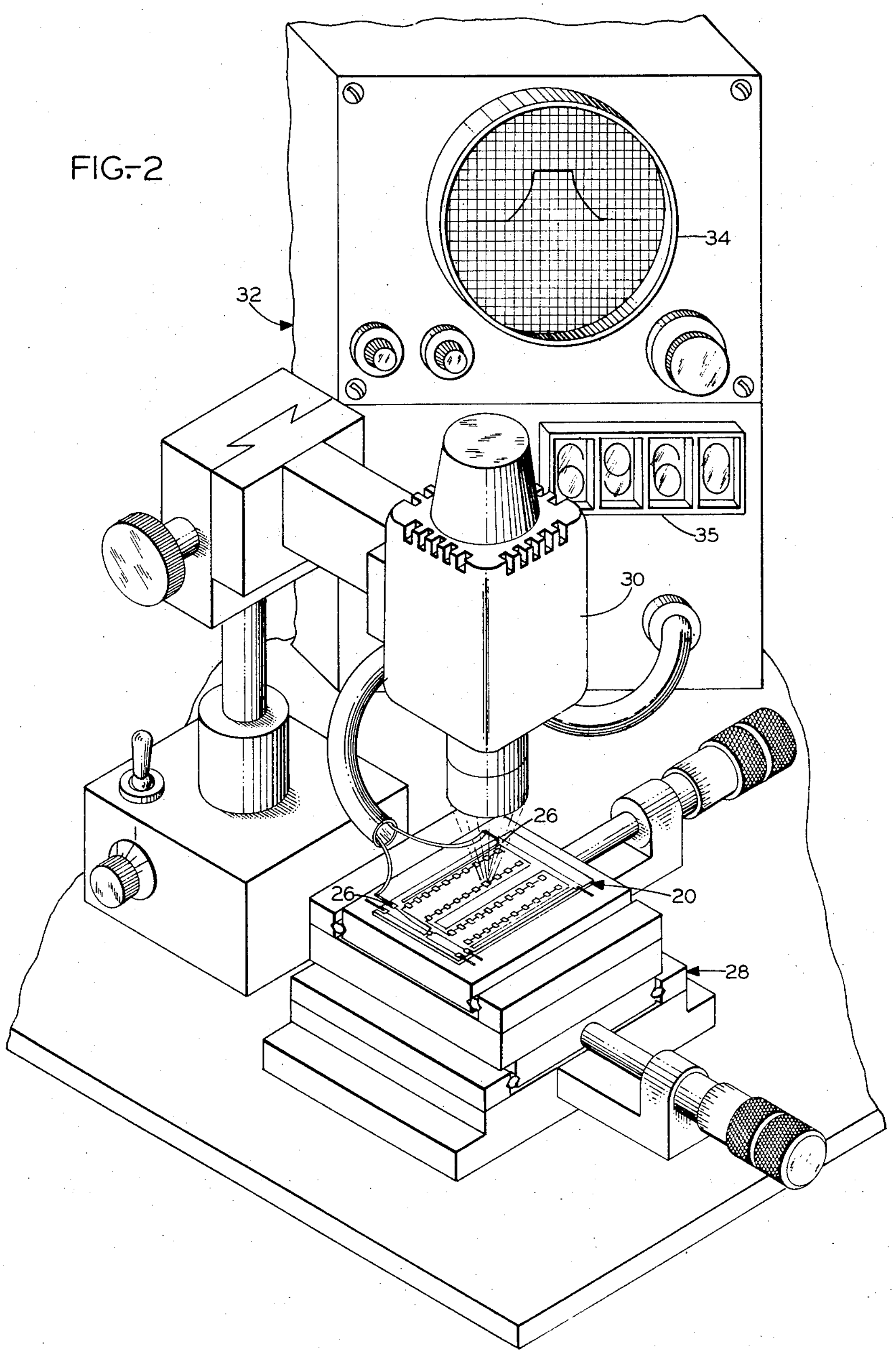
FIG. 2 is a perspective view of diagnostic apparatus of the invention.

FIG. 2 shows a diagnostic tool whereby the integrated circuit or chips 24 which are faulty can be identified. A conventional micrometer-driven positioner assembly 28 is used to support the electronic assembly 20 under a highly directional source 30 of radiant energy. Advantageously, this source 30 can be constructed of a conventional microscope lamp with a tungsten filament. It is important, of course, to isolate the radiant energy to only one of the chips 24. Thus, it is necessary to use a lens system which will focus the energy with sufficient accuracy to accomplish the desired isolation. A microscope lamp available from American Optical Co., Rochester, N.Y. designated as model 653 has been found suitable for this purpose.

A test unit, designated generally by the numeral 32, is connected to the power path 26. The test unit advantageously includes an oscilloscope 34, a digital readout unit 35 and means for producing a signal of predetermined characteristic that can be viewed on the oscilloscope and read quantitatively on the unit 35.

In performing the inventive diagnostic method, an operator establishes the predetermined signal through the path 26. The positioner 28 is used to manipulate the assembly 20 so that one of the chips 24 is directly in the path of the source 30. Radiant energy from the source 30 then "stirs up" the silicon chip 24 by releasing free charge carriers within the semiconductor material. Consequently, the signal emanating from the test signal 32 is changed. An operator can note the change associated with the subjection of the chip 24 to radiant energy by looking at the oscilloscope 34 and the unit 35. After the change is noted, the positioner 28 is moved so that another one of the chips 24 is brought under the source 30. This next chip 24 is also stirred up by the radiant energy and the change in signal associated with the introduction of radiant energy into that chip is also noted by the operator.

This procedure is carried out on each of the chips 24 until one of the chips produces a change in signal which is unique or dissimilar to the changes produced by the majority of the chips. The chip 24 producing the dissimilar change is then considered to be a faulty chip.

As an alternate to the microscope lamp it is possible to use a fiber optics bundle (not shown), the free end of which is positioned above the electronics assembly.

It is desirable to use a fiber optics bundle having a cross-sectional area no larger than the planar dimensions of the chip 24.

As a further alternative, a close-packed array of fiber optics bundles (not shown) can be arranged so that one of the electronic assemblies can be placed under the array. Each of the bundles can be provided with an independent source of radiant energy. By programming switching of the sources it is possible to apply radiant energy successively to each of the chips without having to move the electronic assembly. The programming of switching would, of course, be related to the positioning of the chips on the electronic assembly.

A faulty one of the chips 24 identified by one of the above procedures can then be scraped away from the surface of the substrate 22 and a substitute chip can be used to replace it. Such a replacement technique is described in an article by J. E. Clark, R. C. Reinert and W. J. Valentine entitled "Method and Apparatus for Removing Beam-Lead Devices from a Substrate", *Technical Digest* of Western Electric Co., Inc., No. 15, July 1969, and in a paper by J. E. Clark entitled "More about Beam-Lead Bonding" presented at NEPCON West on Feb. 11, 1970 at Anaheim, Cal. in Specialized Discussion Seminar No. 7.

It is interesting to note that even though one of the chips 24 may include hundreds of active semiconductor devices and may be arranged in an almost infinite variety of ways, the diagnostic technique has a high probability for success. It is not really necessary to know exactly what function of the integrated-circuit chip the radiant energy has effected. The radiant energy may effect some capacitive characteristic and also a change in the wave shape of the test signal; the energy may cause some change in conductivity and resistivity and may change the amount of current flowing through the chip; or the radiant energy may cause some combination change in signal characteristics.

An operator doing the diagnosis, however, need not be concerned with the exact nature of the change or the exact cause-and-effect relationship of the radiant energy and the change. He need only see that one of the chips produced a change different from most of the chips. That bit of knowledge is enough to identify the different chip as being the faulty one. Thus, removal of that identified chip provides a high probability of clearing the faulty existing in the assembly.

In the assembly shown in FIG. 1, the integrated-circuit chips are bonded in position with their active sides down against the substrate 22. Typically, integrated-circuit chips are planar in shape and have active devices, such as transistors and diodes, formed by diffusion into one surface, usually known as the "active side" of the chip. The silicon structure of integrated-circuit chips is usually a good deal thicker than necessary to accommodate the active devices and the side of the chip opposite the active side is displaced by the thickness of the silicon. The active side extends into the silicon approximately 0.001 inch while the overall thickness of the chip is approximately 0.005 inch.

When the chips 24 are bonded with the active side down, it is necessary to use radiant energy from the source 30 which will penetrate the silicon of the chip and get to the active portions of the chip 20 so that these active portions can be stirred as desired. Thus, it is desirable to utilize infrared energy from the source because infrared will penetrate substantial thickness of silicon. A light source having a tungsten filament will produce energy of a proper wavelength to be transmitted through the silicon body of the chip for absorption within the active regions of the chip so that the desired disturbance will occur.

Although certain embodiments of the invention have been shown in the drawings and described in the specification, it is to be understood that the invention is not limited thereto, is capable of modification and can be arranged without departing from the spirit and scope of the invention.

In particular, while the apparatus of FIG. 2 is described as utilizing radiant energy to cause a desired disturbance in each successive semiconductor device, it is important to recognize that the invention is not limited to utilization of radiant energy. A more fundamental quality of the invention is that the semiconductor devices are successively disturbed by a transfer of energy from a source by a phenomena not requiring substantive transmission media. For instance, it is possible to introduce energy by dynamic capacitive or inductive coupling of an energy source with successive semiconductor devices. In other words, many forms of wave-like energy transport phenomena would achieve the desired disturbance. The dynamic capacitive coupling would utilize an electric field; the dynamic inductive coupling would utilize a magnetic field.

It should be noted that none of the energy transfer systems of the invention require a substantive transmission media such as a metallic conductor or even a gaseous atmosphere. The systems will, of course, operate in the presence of gases and the like but the presence of a substantive transmission is not essential for operation.

What is claimed is:

1. A method of distinguishing between faulty and non-faulty separate semiconductor integrated circuit devices among a plurality of substantially identical separate devices connected across parallel conductors, which comprises the steps of:

placing a signal of a predetermined characteristic across the parallel conductors;

successively transferring disturbing energy uniformly onto the entire surface of each of the substantially identical integrated circuit devices from a source by a phenomena not requiring a substantive transmission media;

detecting changes in characteristic of the signal across the parallel conductors associated with the absorption of the gross disturbing energy by each of the integrated circuit devices; and detecting dissimilarities in changes of signal characteristics produced by various ones of the devices to thereby distinguish such devices as being faulty.

2. The method of claim 1 wherein the disturbing energy is radiant energy.

3. The method of claim 1 wherein the disturbing energy is transferred through an electric field.

4. The method of claim 1 wherein the disturbing energy is transferred through a magnetic field.

5. A method of diagnosing a defective assembly of a plurality of separate substantially identical semiconductor integrated circuit devices connected across parallel conductors; which comprises the steps of:

placing a signal of a predetermined characteristic across the parallel conductors;

successively directing a source of radiant energy uniformly onto the entire surface of each of the separate substantially identical devices;

detecting a change in characteristic of the signal across the parallel conductors associated with the gross absorption of the radiant energy by each of the devices; and identifying as faulty those devices which produce a change in signal characteristic which is different from the change associated with the gross absorption of the radiant energy by a majority of the devices.

6. The method of claim 5 wherein the radiant energy is infrared.

7. The method of claim 6 wherein the semiconductor devices are silicon planar devices having an active side and an inactive side and the infrared radiant energy is introduced by initial passage through the inactive side.

8. Apparatus for diagnosing a defective assembly of a plurality of substantially identical separate semiconductor integrated circuit devices connected across parallel conductors, which comprises:

means for placing a signal of predetermined characteristic across the parallel conductors;

means for successively directing a source of disturbing radiant energy uniformly onto the entire surface of each of the devices; and means for detecting the change in signal characteristic across the parallel conductors associated with the gross absorption of the radiant energy by each of the devices to assist in identifying as faulty those devices which produce a change in signal characteristic dissimilar to the change associated with gross absorption of the radiant energy by the majority of the devices.

9. The apparatus of claim 8 wherein the means for directing radiant energy includes a micrometer-driven positioner whereby the semiconductor devices are accurately located with respect to the source.

10. The apparatus of claim 8 wherein the radiant energy is infrared.

11. The apparatus of claim 10 wherein the semiconductor devices and planar devices having an active side and an inactive side and the infrared radiant energy source is adapted to introduce energy initially through the inactive side.

* * * * *